(12) United States Patent
Rhee et al.

(10) Patent No.: US 9,946,372 B2
(45) Date of Patent: Apr. 17, 2018

(54) PEN TYPE INPUT DEVICE AND METHOD FOR CHARACTER INPUT AND MOUSE FUNCTIONS

(75) Inventors: Do-Young Rhee, Seoul (KR); Jeong-Seok Lee, Seoul (KR); Seong-Min Seo, Hwaseong-si (KR)

(73) Assignee: Samsung Electronics Co., Ltd (KR)

( * ) Notice: Subject to any disclaimer, the term of this patent is extended or adjusted under 35 U.S.C. 154(b) by 1058 days.

(21) Appl. No.: 12/831,369

(22) Filed: Jul. 7, 2010

(65) Prior Publication Data
US 2011/0006982 A1    Jan. 13, 2011

(30) Foreign Application Priority Data

Jul. 7, 2009 (KR) .................. 10-2009-0061625

(51) Int. Cl.
*G06F 3/033*    (2013.01)
*G06F 3/038*    (2013.01)
*G06F 3/0354*   (2013.01)

(52) U.S. Cl.
CPC ............ *G06F 3/0383* (2013.01); *G06F 3/038* (2013.01); *G06F 3/03545* (2013.01)

(58) Field of Classification Search
CPC .............................. G06F 3/033; G06F 3/03545
USPC .................................................. 345/157, 179
See application file for complete search history.

(56) References Cited

U.S. PATENT DOCUMENTS

| | | | | |
|---|---|---|---|---|
| 6,130,666 A * | 10/2000 | Persidsky | ........... | 345/179 |
| 2003/0006975 A1 | 1/2003 | Moriya et al. | | |
| 2006/0250357 A1 * | 11/2006 | Safai | ........... | 345/157 |
| 2006/0250380 A1 * | 11/2006 | Oliver | ........... | 345/179 |
| 2007/0003168 A1 | 1/2007 | Oliver | | |
| 2008/0055280 A1 * | 3/2008 | Bi | ........... | G06F 3/03545 345/179 |
| 2008/0134101 A1 | 6/2008 | Newman | | |
| 2008/0166049 A1 * | 7/2008 | Wang et al. | ........... | 382/189 |
| 2008/0225007 A1 * | 9/2008 | Nakadaira et al. | ........... | 345/173 |
| 2008/0238887 A1 * | 10/2008 | Love | ........... | 345/179 |
| 2008/0259033 A1 * | 10/2008 | Mu | ........... | 345/163 |
| 2009/0113091 A1 * | 4/2009 | Miller et al. | ........... | 710/64 |
| 2010/0006350 A1 * | 1/2010 | Elias | ........... | G06F 3/044 178/18.06 |

FOREIGN PATENT DOCUMENTS

CN    1480900       3/2004
CN   201035537      3/2008
(Continued)

OTHER PUBLICATIONS

Korean Office Action dated Jul. 20, 2016 issued in counterpart application No. 10-2016-0045652, 9 pages.

(Continued)

*Primary Examiner* — Jonathan Blancha

(74) *Attorney, Agent, or Firm* — The Farrell Law Firm, P.C.

(57) ABSTRACT

A pen-type input device and method for sending positional input to a host device, in which a first switch, located on the pen's tip is provided to input character strokes in a character input mode and move a mouse cursor in a mouse mode, a second switch is provided to perform a mouse left-click operation in the mouse mode, and a third switch is provided to switch an input mode of the pen-type input device.

16 Claims, 5 Drawing Sheets

(56) References Cited

FOREIGN PATENT DOCUMENTS

| | | |
|---|---|---|
| CN | 101154136 | 4/2008 |
| JP | 2001-175404 | 6/2001 |
| JP | 3520823 | 4/2004 |
| KR | 1020010079439 | 8/2001 |

OTHER PUBLICATIONS

European Search Report dated May 11, 2016 issued in counterpart application No. 10168679.8-1959, 6 pages.
Korean Office Action dated Jul. 16, 2015 issued in counterpart application No. 10-2009-0061625, 7 pages.
U.S. Office Action dated Nov. 29, 2016 issued in counterpart U.S. Appl. No. 15/045,813, 29 pages.
Korean Office Action dated Aug. 7, 2017 issued in counterpart application No. 10-2017-0059589, 11 pages.
U.S. Office Action dated Oct. 19, 2017 issued in counterpart U.S. Appl. No. 15/045,813, 36 pages.

\* cited by examiner

|  | CHARACTER INPUT MODE | MOUSE MODE |
|---|---|---|
| SWITCH 1 | CHARACTER INPUT FUNCTION | CURSOR MOVE FUNCTION |
| SWITCH 2 | ADDITIONAL FUNCTION | MOUSE LEFT CLICK |
| SWITCH 3 | INPUT MODE SWITCHING | INPUT MODE SWITCHING |

FIG.4

|  | CHARACTER INPUT MODE | MOUSE MODE |
|---|---|---|
| INPUT OF SWITCH 1 | DETECT LOCATION INFORMATION, MOVE CURSOR, DISPLAY STROKE | DETECT LOCATION INFORMATION, MOVE CURSOR. |
| NO INPUT OF SWITCH 1 | DETECT LOCATION INFORMATION, MOVE CURSOR. | IGNORE LOCATION INFORMATION, MAINTAIN CURSOR |

FIG.5

PEN TYPE INPUT DEVICE AND METHOD FOR CHARACTER INPUT AND MOUSE FUNCTIONS

PRIORITY

This application claims priority under 35 U.S.C. § 119(a) to a Korean Patent Application filed in the Korean Intellectual Property Office on Jul. 7, 2009 and assigned Ser. No. 10-2009-0061625, the entire disclosure of which is hereby incorporated by reference.

BACKGROUND OF THE INVENTION

1. Field of the Invention

The present invention relates generally to a pen-type input device and an input method using the same, more particularly to a pen-type input device for performing both a character input function and a mouse function, and an input method using the same.

2. Description of the Related Art

A pen-type input device, which performs tracking using an optical sensor and a relative coordinate system usually operates in a character input mode and a mouse input mode. When it is in character input mode, it will record tracking information both when the pen moves on a surface (e.g., a mouse pad) and when it moves above the surface. Without such tracking, character input may not be correctly performed.

FIGS. 1A and 1B show how to input (enter) characters using a general pen-type input device. Referring to FIGS. 1A and 1B, after each stroke of a character is input, the pen should be lifted up and moved to a start point of the next stroke to input the next stroke, as shown in FIG. 1A.

FIG. 1B shows the character input results that may be obtained when the pen-type input device does not recognize the tracking information of the pen while the pen moves above the surface (the mouse pad), in character input mode. If movements of the pen cannot be sensed while the pen is lifted up from the surface and moved, the next stroke starts at the last point of the previous stroke, causing character input error.

In the character input mode, the pen-type input device acquires input information by turning on a switch from the beginning to the end of each stroke while the pen is moved in contact with the surface. Afterwards, it should stop acquiring information by turning off a switch after completion of the current stroke and wait for the next stroke. However, even in this case, location information of the pen should be continuously measured to exactly perform character input by aligning the next stroke with the current stroke.

Mouse mode, in which a mouse function is implemented, is different from the character input mode. Generally, a user holds a mouse, against the surface of the mouse pad. If the mouse is placed on an edge of the mouse pad, the user lifts up the mouse and moves it to the center of the mouse pad to use it again. When the mouse is lifted up and moved in this way, the cursor or mouse pointer on the display does not move correspondingly. This allows the user to use the mouse with his arm placed in a comfortable position.

Problems may occur when a pen-type input device provides both a mouse function and a character input function. In a character input mode, even when the pen is lifted up from the surface of the mouse pad and moved, the location information is recognized and consequently moves the cursor. However, in mouse mode, the cursor is not moved when the pen is lifted up from the surface and moved. Therefore, in the case of character input, the pen's location information is recognized to move the cursor even when the pen is lifted up from the surface and moved. When a character input mode pen is used for a mouse operation, the mouse cursor is moved even when the pen (or mouse) is lifted up from the surface and moved, so the user may not use the mouse in a comfortable position. In contrast, when using a mouse mode pen for character input, the mouse cursor is not moved when the pen is lifted up from the surface and moved, thus it is not possible to exactly draw characters using the pen as shown in FIG. 1B.

In the conventional pen-type input device like the pen mouse, the character input and the mouse functions are not separated. Because of the above contradictory situation, the conventional pen-type input device may not smoothly perform both functions.

In the conventional pen mouse, if the pen is lifted up from the surface by a certain distance or more, the cursor position is not tracked, and in the character input mode or the mouse mode, if the pen tip is pressed with a predetermined force, with the pen mouse in contact with the surface of the mouse pad, a switch is operated to perform a mouse left-click function.

Because tracking is not performed when the pen is lifted up from the surface a user having the habit of lifting up the pen to some height during inter-stroke, inter-character and inter-word movements in writing text, may fail in the character input operation as shown in FIG. 1B. In this case, the user needs to practice writing characters without excessively lifting up the pen. In addition, to activate the switch during character input, the user must inconveniently press the pen with predetermined force.

Meanwhile, for a pen in mouse mode, when the user moves the pen mouse on the surface he must carefully handle the pen mouse so that the switch mounted on the pen tip does not operate. Therefore, if the hardware is configured to operate even though the pen contacts the surface with less force, ensuring easy character input in the character input mode causes normal mouse operation to become more difficult. That is, in the conventional pen-type input device, if the operation height characteristic and the sensitivity of the pen tip switch are improved to increase performance of the character input operation, the mouse operation becomes significantly more difficult.

SUMMARY OF THE INVENTION

An aspect of the present invention is to address at least the above-mentioned problems and/or disadvantages and to provide at least the advantages described below. Accordingly, an aspect of the present invention provides a peri-type input device capable of smoothly offering both a character input operation and a general mouse operation to a host, and a method for performing input to the host using a pen-type input device.

In accordance with one aspect of the present invention, there is provided a pen-type input device for a host device, the input device including a first switch located on a pen tip, for inputting a character stroke in a character input mode and moving a mouse cursor in a mouse mode; a second switch for performing a mouse left-click operation in the mouse mode; and a third switch for switching an input mode of the pen-type input device.

In accordance with one aspect of the present invention, there is provided a method for performing input on a host device using a pen-type input device, the method including determining the current input mode of a pen-type input device; when the input mode is a character input mode, moving a cursor according to location information of the pen-type input device and displaying a character stroke, while a first switch located on a pen tip of the pen-type input device is input; and when the input mode is a mouse mode, moving the cursor according to location information of the pen-type input device while the first switch is input, and maintaining the cursor while the first switch is not input.

BRIEF DESCRIPTION OF THE DRAWINGS

The above and other aspects, features and advantages of certain embodiments of the present invention will become more apparent from the following description taken in conjunction with the accompanying drawings, in which:

FIG. 4 is a table illustrating functions of switches in character input mode and mouse mode during an input operation using a pen-type input device according to an embodiment of the present invention;

FIG. 5 is a table illustrating a host's processing operation based on input from a first switch in character input mode and mouse mode during an input operation using a pen-type input device according to an embodiment of the present invention.

Throughout the drawings, the same drawing reference numerals will be understood to refer to the same elements, features and structures.

DETAILED DESCRIPTION OF EMBODIMENTS OF THE PRESENT INVENTION

Various embodiments of the present invention will now be described in detail with reference to the accompanying drawings. In the following description, specific details such as configuration and components are merely provided to assist the overall understanding of embodiments of the present invention. Therefore, it should be apparent to those skilled in the art that various changes and modifications of the embodiments described herein can be made without departing from the scope and spirit of the invention. In addition, descriptions of well-known functions and constructions are omitted for clarity and conciseness.

The present invention provides a pen-type input device for an input operation of a host, and a method for performing input using the pen-type input device. To this end, the present invention divides the operation mode of a pen-type input device into a character input mode and a mouse mode, and sets the functions of switches on the pen-type input device differently according to the input modes. When the pen-type input device of the present invention transmits input data to the host, the host processes the data and smoothly performs each of the input modes. A detailed description will be made with reference to the accompanying drawings.

Figures 1A, 1B:
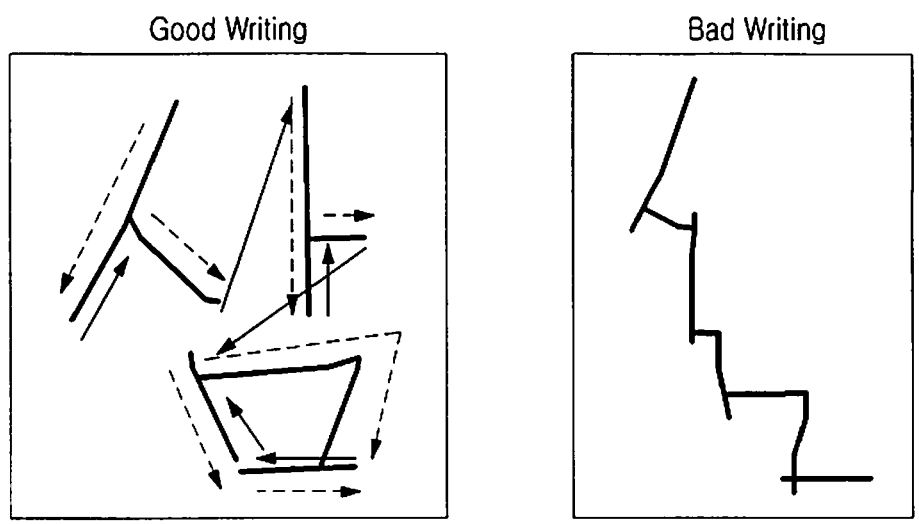
FIGS. 1A and 1B illustrate how to input characters using a general pen-type input device.
Figure 2A:
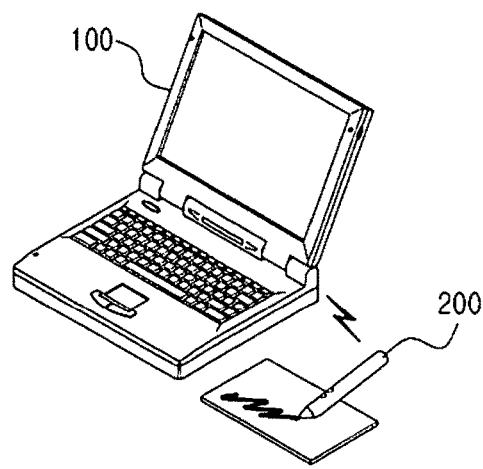
FIGS. 2A to 2C illustrate a host and a pen-type input device according to an embodiment of the present invention.
Figure 2B:
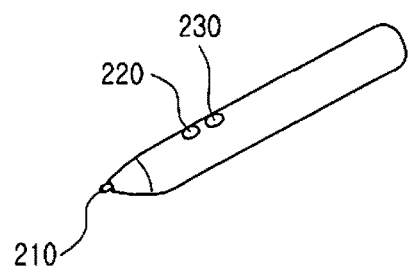
Figure 2C:
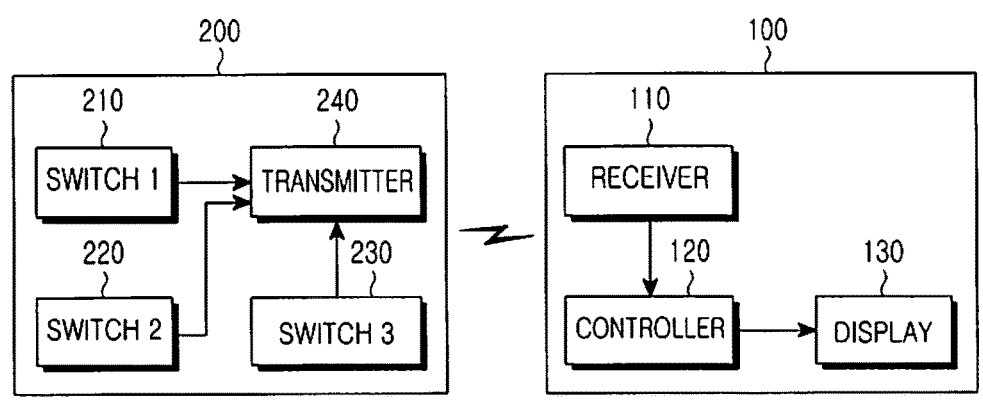

FIGS. 2A to 2C schematically illustrates a host and a pen-type input device according to an embodiment of the present invention. As shown in FIG. 2A, an input system using the pen-type input device of the present invention includes a host 100 and a pen-type input device 200. The host 100 receives input data from the pen-type input device 200, processes the data in an input data processing method and performs a relevant input operation. The pen-type input device 200 operates in the character input mode or the mouse mode by the user to perform input. The host 100 may include any electronic device that is equipped with a display and a controller, such as a desktop computer, notebook computer or a portable terminal. The host 100 may be connected to the pen-type input device 200 using short-range wireless communications such as Bluetooth or ZigBee to exchange input data.

Referring to FIG. 2B, the pen-type input device 200 according to an embodiment of the present invention includes a first switch 210, a second switch 220, and a third switch 230. The pen-type input device 200 provides location information of the pen tip to the host 200 during its operation. The location information may be calculated using data from a general optical sensor and the relative coordinate system.

The first switch 210 may be implemented in the form of a sensor or a physical button that is located on the pen tip to sense the contact/non-contact between the pen tip and the surface of the mouse pad. The first switch 210 may be input (clicked) when the user holds the pen with a hand and presses it down with slight force. In accordance with an embodiment of the present invention, the first switch 210 performs a cursor-move function while in mouse mode, and a character stroke input function when in character input mode.

The second switch 220, as shown in FIG. 2B, is configured to be located in the position where the user can easily click it with a thumb or index finger while he holds the pen with his hand. In accordance with an embodiment of the present invention, the second switch 220 performs a mouse left-click function in mouse mode, and may match its click (or input) to other additional functions in character input mode. For example, the second switch 220 may be used as additional function keys such as a Korean/English switch key or a special character input key.

The third switch 230, as shown in FIG. 2B, is also configured to be located in a position where the user can easily click it with a thumb or index finger while he holds the pen with a hand. In accordance with an embodiment of the present invention, the third switch 230 performs switching between the mouse mode and the character input mode.

During an input operation, the pen-type input device 200 provides the switches' state information (on/off information of the first to third switches 210, 220 and 230) and the pen tip's coordinates (horizontal and vertical coordinates) to the host 100 as input data.

An input operation of the present invention is performed by processing input data received from the pen-type input device 200, with a controller found in the host 100 or a device driver for the pen-type input device 200, which is installed on the host 100. Therefore, all input operations are processed in a host-centered way, making it possible to configure a user-centered interface.

FIG. 2C illustrates an example of a pen-type input device and a host device according to an embodiment of the present invention.

The pen-type input device 200, according to an embodiment of the present invention includes the first switch 210, the second switch 220, the third switch 230, a transmitter 240, and the host device 100 for performing input based on the signal from the pen-type input device 200, which includes a receiver 110, a controller 120, and a display 130.

During an input operation, a signal generated by the user from each switch in the pen-type input device 200 is provided to the receiver 110 in the host 100 via the transmitter 240, using near-field communications such as Bluetooth or ZigBee. The host 100 provides the input signal received via the receiver 110, to the controller 120 to process input data and displays the results on the display 130. The input data processing operation by the controller 120 will be described in detail with reference to FIGS. 3 to 6.

Figure 3:
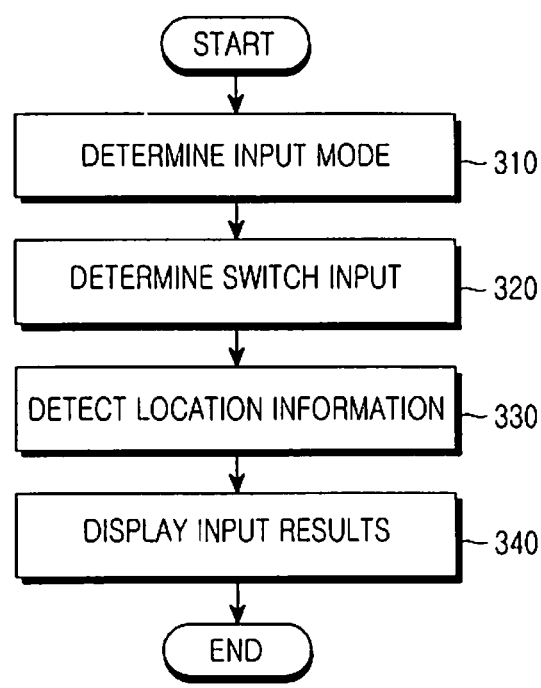
FIG. 3 illustrates the processing of input data during an input operation using a pen-type input device according to an embodiment of the present invention.

FIG. 3 illustrates the processing of input data during an input operation using a pen-type input device according to an embodiment of the present invention.

Referring to FIG. 3, the controller 120 of the host 100 determines an input mode of the pen-type input device 200 in step 310. As for the input mode, the user may arbitrarily set an initial mode that is set when the pen-type input device 200 is first connected or after the host 100 is powered on, and the input mode may be automatically set to a particular initial input mode according to the running application. For example, when the host 100 runs an application for writing Short Message Service (SMS) text messages, the input mode may be automatically set to the character input mode, and when the host 100 runs an application for Internet web browsing, the input mode may be automatically set to the mouse mode. Even in the latter case, the user may change the input mode using the third switch 230 of the pen-type input device 200. This is because during the web browsing session, the user might need to switch the input mode to the character input mode to input Uniform Resource Locator (URL) addresses and search words. Even in this case, the input mode may be automatically changed according to the input User Interface (UI). For instance, the input mode may be automatically changed to character input mode when the user clicks a text input window.

Thereafter, the controller 120 determines the state information (on/off information) of each switch from the input data in step 320, and detects location information of the pen-type input device 200 in step 330.

In step 340, the controller 120 processes the input data according to an embodiment of the present invention, and displays the processing results on the display 130. The operation of processing the input data depending on the input information of each of the switches will be described in detail in conjunction with FIG. 6.

FIG. 4 illustrates the functions of the switches in character input mode and mouse mode during an input operation using a pen-type input device according to an embodiment of the present invention.

Referring to FIG. 4, when the input mode of the pen-type input device 200 is character input mode, the first switch 210 performs the character input function, and is used to draw or write strokes of a character. The user may input the strokes of a character using the pen-type input device 200, while clicking (inputting) the first switch 210. In this case, the user inputs a stroke of a character while clicking the first switch 210. To input the next stroke, the user moves the pen-type input device 200 without clicking the first switch 210. However, even in this case, the pen-type input device 200 transmits its location information to the host 100 along with the input data, and the host 100 identifies the pen's location information in both when the first switch 210 is clicked and when it is not clicked, and then displays the identified location information on the display 130. Because of this, the user may perform exact character input operation by inputting the next stroke more accurately.

In character input mode, the second switch 220 may set an additional function for character input. For example, the second switch 220 may be used as function keys such as, for example, a Korean/English switch key, a special character input key, or a key for changing the size/color of the cursor for character input.

When in character input mode, the third switch 230 performs an input mode switch function to switch to mouse mode.

When the pen-type input device 200 is in mouse mode, the first switch 210 performs a cursor move function. In other words, the user may move the cursor displayed on the screen by moving the pen-type input device 200 while clicking the first switch 210. In mouse mode, if the first switch 210 is not clicked, the mouse cursor is not moved even though the pen-type input device 200 is moved. Hence, if the pen-type input device 200 is placed on an edge of the mouse pad, the user may use the pen-type input device 200 in a comfortable position by moving the pen-type input device 200 to the center of the mouse pad without clicking the first switch 210.

In mouse mode, the second switch 220 performs the mouse left-click function. The user performs the mouse left-click function by additionally inputting the second switch 220 while moving the cursor in the state where the first switch 210 of the pen-type input device 200 is clicked.

In mouse mode, the third switch 230 performs an input mode switch function to switch to character input mode.

FIG. 5 illustrates a host's processing operation based on input from the first switch in character input mode and mouse mode during an input operation using a pen-type input device according to an embodiment of the present invention.

When in character input mode, if the user moves the pen-type input device 200 while inputting (clicking) the first switch 210, the controller 120 of the host 100 detects information about the location to which the pen-type input device 200 has moved from the received input data, and moves the cursor on the display 130 to correspond to the location information. In addition, the controller 120 displays a stroke for character input at the position to which the pen-type input device 200 has moved.

In character input mode, even if the user moves the pen-type input device 200 without inputting the first switch 210, the controller 120 detects information about the location to which the pen-type input device 200 has moved, from the received input data, and moves the cursor on the display 130 to correspond to the location information.

In mouse mode, if the user moves the pen-type input device 200 while inputting the first switch 210, the controller 120 detects information about the location to which the pen-type input device 200 has moved from the received input data and moves the cursor on the display 130 to correspond to the location information.

However, in mouse mode, if the user moves the pen-type input device 200 without inputting the first switch 210, the controller 120 disregards information about the location to which the pen-type input device 200 has moved, from the received input data, and maintains the intact position of the cursor on the display 130.

Figure 6:
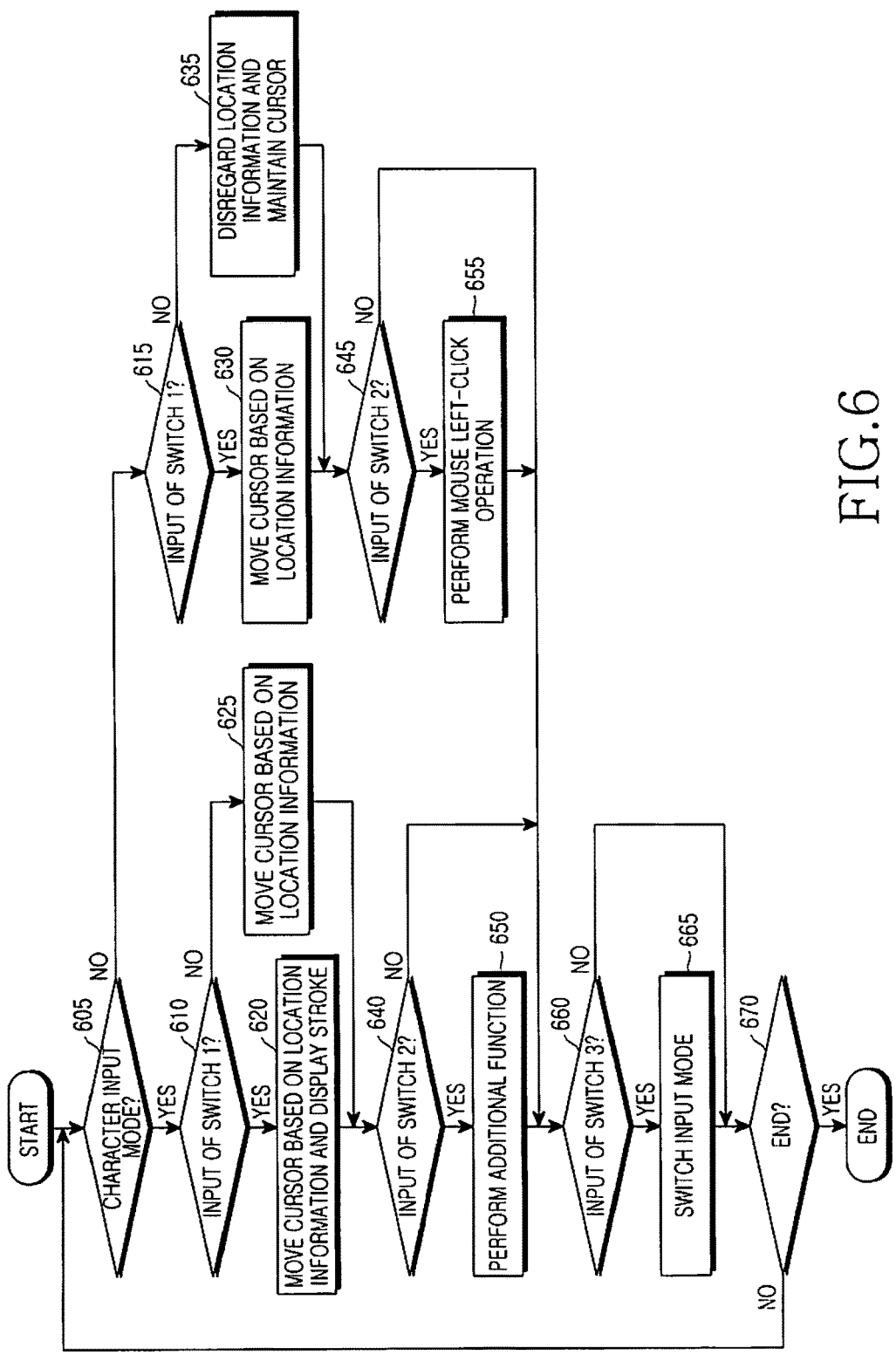
FIG. 6 illustrates the processing of input data during an input operation using a pen-type input device according to an embodiment of the present invention.

FIG. 6 illustrates the processing of input data during an input operation using a pen-type input device according to an embodiment of the present invention.

The pen-type input device 200 according to an embodiment of the present invention always transmits location information of its pen and state information of the switches to the host 100. The host 100 may initially set the input mode according to the running application or the application to be running, and performs the operation shown in FIG. 6 according to the input modes.

Referring to FIG. 6, the controller 120 of the host 100 determines in step 605 whether an input mode of the pen-type input device 200 is in character input mode.

If the input mode is character input mode in step 605, the controller 120 determines in step 610 whether the first switch 210 is input (clicked). If the first switch 210 is input in step 610, the controller 120 detects location information of the pen-type input device 200 from input data received from the pen-type input device 200, moves the cursor on the display 130 according to the location information, and displays a character stroke in step 620. The host 100 continuously displays the character stroke on the display 130 while the first switch 210 is input.

If the first switch 210 is not clicked in step 610, the controller 120 moves the cursor on the display 130 according to the location information without displaying character strokes in step 625.

The controller 120 determines in step 640 whether the second switch 220 is input. If the second switch 220 is clicked in step 640, the controller 120 performs a preset additional function in step 650 and then proceeds to step 660. However, if the second switch 220 is not clicked in step 640, the controller 120 jumps to step 660.

If the input mode is not the character input mode but the mouse mode in step 605, the controller 120 determines in step 615 whether the first switch 210 is clicked.

If the first switch 210 is clicked in step 615, the controller 120 detects location information of the pen-type input device 200 from the input data received from the pen-type input device 200, and moves the cursor displayed on the display 130 according to the location information in step 630.

If the first switch 210 is not clicked in step 615, the controller 120 disregards the location information of the pen-type input device 200 in the input data received from the pen-type input device 200, and maintains the cursor on the display 130 without moving, in step 635.

The controller 120 determines in step 645 whether the second switch 220 is clicked. If the second switch 220 is clicked in step 645, the controller 120 performs a mouse left-click operation in step 655, and then goes to step 660. However, if the second switch 220 is not clicked in step 645, the controller 120 skips to step 660.

The controller 120 determines in step 660 whether the third switch 230 is clicked. If the third switch 230 is clicked in step 660, the controller 120 changes the input mode of the pen-type input device 200 in step 665, and then proceeds to step 670. However, if the third switch 230 is not clicked in step 660, the controller 120 skips to step 670.

The controller 120 determines in step 670 whether the input operation has been completed. If so, the controller 120 ends the input operation of the pen-type input device 200. Otherwise, the controller 120 returns to step 605 and repeats the input.

As is apparent from the foregoing description, with such operations and configurations, the present invention can smoothly perform both the character input operation and the general mouse operation, using the novel pen-type input device. When the character input operation and the mouse operation are performed using the pen-type input device, functions of the switches are changed in the respective operation modes to process and control the input data according thereto, making it possible to shift smoothly between the two operation modes.

In addition, the pen-type input device of the present invention transmits input data to the host when the switch is clicked. Then the input data is processed in the host according to the input data processing method of the present invention. Accordingly the input operation of the present invention is a host-centered input operation, which helps reduce the design complexity of the pen-type input device.

While the present invention has been shown and described with reference to certain embodiments thereof, it will be understood by those skilled in the art that various changes in form and details may be made therein without departing from the spirit and scope of the invention as defined by the appended claims and their equivalents. For example, although the mouse mode and the character input mode have been considered in certain embodiments of the present invention, the character input mode may include an input mode not only for character input but also for picture drawing. Even in this case, the input method of the present invention can operate like in the above-described character input mode, and the second switch may be set as a function key for changing the color, size and/or shape of the cursor (or brush).

What is claimed is:

1. A pen-type input device for performing input to a host device, comprising:
 a first switch located on an end of a pen tip, configured to generate a first signal used for click inputting a character stroke in a character input mode and moving a mouse cursor in a mouse mode; and
 a second switch configured generate a second signal used for performing a mouse click operation in the mouse mode,
 wherein the host device:
 executes a web browsing application and displays an execution screen for the web browsing application comprising a text input window;
 while the web browsing application is executed, moves the mouse cursor according the first signal or maintains a location of the mouse cursor, based on whether the first signal is detected in the mouse mode;
 changes an input mode of the host device from the mouse mode to the character input mode, in response to detecting the second signal when the mouse cursor is disposed in the text input window;
 displays a character stroke according to the first signal or moves the location of the mouse cursor, based on whether the first signal is detected in the character input mode; and
 changes at least one of color, size and shape of the character by using the second signal.

2. The pen-type input device of claim 1, further comprising a transmitter for transmitting location information of the pen-type input device and at least one of the first signal and the second signal, to the host device.

3. The pen-type input device of claim 2, wherein the transmitter transmits the location information of the pen and at least one of the first signal and the second signal to the host device using at least one of Bluetooth and ZigBee short-range wireless communication.

4. A method for performing input in a host device using a pen-type input device, comprising:
 executing a web browsing application and displaying an execution screen for the web browsing application comprising a text input window;
 determining an input mode as a mouse mode when the web browsing application is executed;

receiving location information of the pen-type input device from the pen-type input device;

receiving a first signal used for click inputting a character stroke in a character input mode and moving a mouse cursor in the mouse mode from the pen-type input device;

receiving a second signal used for performing a mouse click operation in the mouse mode from the pen-type input device;

moving the mouse cursor according to the first signal and the location information or maintaining a location of the mouse cursor, based on whether the first signal is detected in the mouse mode;

changing an input mode of the host device from the mouse mode to the character input mode, in response to detecting the second signal when the mouse cursor is disposed in the text input window;

displaying a character stroke according to the location information and the first signal or moving the location of the mouse cursor, based on whether the first signal is detected in the character input mode; and changing at least one of color, size and shape of the character by using the second signal.

5. The method of claim 4, wherein the input mode is automatically set according to a type of application executed in the host device.

6. The method of claim 4, wherein the input mode is automatically set to the character input mode when the text input window for character input is activated in the host device.

7. The method of claim 4, wherein the mouse click operation comprises at least one of a language switching operation and a special character input operation.

8. The method of claim 4, wherein the location information and the at least one of the first signal and the second signal are received using at least one of Bluetooth and ZigBee short-range wireless communication.

9. A host device comprising:
a display;
a receiver; and
a controller configured to:
execute a web browsing application and display, on the display, an execution screen for the web browsing application comprising a text input window;
determine an input mode as a mouse mode when the web browsing application is executed;
receive, through the receiver, location information of a pen-type input device, a first signal used for click inputting a character stroke in a character input mode and moving a mouse cursor in the mouse mode, and a second signal used for performing a mouse click operation in the mouse mode;
move the mouse cursor according to the first signal and the location information or maintain a location of the mouse cursor, based on whether the first signal is detected in the mouse mode;
change the input mode of the host device from the mouse mode to the character input mode, in response to detecting the second signal when the mouse cursor is disposed in the text input window;
display the character stroke according to the location information and the first signal or move the location of the mouse cursor, based on whether the first signal is detected in the character input mode; and
change at least one of color, size and shape of the character by using the second signal.

10. The host device of claim 9, wherein the input mode is automatically set according to a type of application executed in the host device.

11. The host device of claim 9, wherein the input mode is automatically set to the character input mode when the text input window for character input is activated in the host device.

12. The host device of claim 9, wherein the mouse click operation comprises at least one of a language switching operation and a special character input operation.

13. The host device of claim 9, wherein the receiver receives the location information and the at least one of the first signal and the second signal using at least one of Bluetooth and ZigBee short-range wireless communication.

14. A method for controlling a pen-type input device for performing input to a host device, comprising:
generating a first signal used for click inputting a character stroke in a character input mode and moving a mouse cursor in a mouse mode; and
generating a second signal used for performing a mouse click operation in the mouse mode,
wherein the host device:
executes a web browsing application and displays an execution screen for the web browsing application comprising a text input window;
while the web browsing application is executed, moves the mouse cursor according to the first signal or maintains a location of the mouse cursor, based on whether the first signal is detected in the mouse;
changes an input mode of the host device from the mouse mode to the character input mode, in response to detecting the second signal when the mouse cursor is disposed in the text input window;
displays a character stroke according to the first signal or moves the location of the mouse cursor, based on whether the first signal is detected in the character input mode; and
changes at least one of color, size and shape of the character by using the second signal.

15. The method of claim 14, further comprising transmitting location information of the pen-type input device to the host device.

16. The method of claim 15, wherein the location information of the pen-type input device and at least one of the first signal and the second signal are transmitted to the host device using at least one of Bluetooth and ZigBee short-range wireless communication.

* * * * *